United States Patent [19]
Jeffries

[11] Patent Number: 5,636,342
[45] Date of Patent: Jun. 3, 1997

[54] SYSTEMS AND METHOD FOR ASSIGNING UNIQUE ADDRESSES TO AGENTS ON A SYSTEM MANAGEMENT BUS

[75] Inventor: Kenneth L. Jeffries, Leander, Tex.

[73] Assignee: Dell USA, L.P., Austin, Tex.

[21] Appl. No.: 389,849

[22] Filed: Feb. 17, 1995

[51] Int. Cl.$^6$ .............................. G01R 31/28; G06F 11/00
[52] U.S. Cl. ........................................ 395/185.01; 395/829
[58] Field of Search ......................... 395/185.01, 185.06, 395/402, 410, 829, 846; 340/825.07, 825.52

[56] References Cited

U.S. PATENT DOCUMENTS

| | | | |
|---|---|---|---|
| 4,679,192 | 7/1987 | Vanbrabant | 370/85 |
| 4,701,878 | 10/1987 | Gunkel | 364/900 |
| 4,727,475 | 2/1988 | Kiremidjian | 364/200 |
| 4,773,005 | 9/1988 | Sullivan | 364/200 |
| 5,148,389 | 9/1992 | Hughes | 395/800 |
| 5,175,822 | 12/1992 | Dixon | 395/275 |
| 5,204,669 | 4/1993 | Dorfe | 340/825.52 |
| 5,317,693 | 5/1994 | Cuenod | 395/275 |
| 5,379,437 | 1/1995 | Celi, Jr. | 395/750 |
| 5,404,460 | 4/1995 | Thomsen | 395/275 |
| 5,483,518 | 1/1996 | Whetsel | 370/13 |
| 5,499,374 | 3/1996 | Di Giulio | 395/728 |
| 5,524,269 | 6/1996 | Hamilton | 395/829 |

*Primary Examiner*—Hoa T. Nguyen
*Assistant Examiner*—Glenn Snyder
*Attorney, Agent, or Firm*—Skjerven, Morrill, MacPherson, Franklin & Friel; Stephen A. Terrile

[57] ABSTRACT

A system and method for automatically assigning addresses to agents on a system management bus in a computer system without requiring user intervention, i.e., without requiring the user to manually or programmatically set physical or logical switches. The computer system includes a system management bus which preferably uses the I$^2$C serial protocol. The bus includes at least one SMB master and a plurality of slaves for performing desired monitoring and control functions in the computer system. According to the present invention, the SMB master assigns unique addresses to each of the SMB slaves automatically and without user intervention. This provides a simpler, more efficient, and less error prone method for assigning addresses to SMB agents. In addition, the system of the present invention automatically assigns unique addresses to new devices inserted on the bus while the bus is operating and thus allows for hot pluggable devices.

12 Claims, 11 Drawing Sheets

SYSTEMS AND METHOD FOR ASSIGNING UNIQUE ADDRESSES TO AGENTS ON A SYSTEM MANAGEMENT BUS

FIELD OF THE INVENTION

The present invention relates to a system and method for automatically assigning unique addresses to agents on a serial system management bus in a computer system without requiring user intervention.

DESCRIPTION OF THE RELATED ART

Computer systems generally include a plurality of devices which are interconnected by one or more various buses. For example, a typical computer system architecture includes a CPU coupled to main memory through a host or memory bus. This host or memory bus is in turn coupled to an expansion bus. In modem computer architectures, this expansion bus is typically a local bus such as the peripheral component interconnect (PCI) bus. This local bus may then be coupled to a more traditional expansion bus such as the AT bus or Industry Standard Architecture (ISA) bus, the Extended ISA (EISA) bus or the microchannel architecture (MCA) bus.

A computer system may also include a bus referred to as a system management bus used for monitoring operations within the system without involvement of the host processor and/or without requiring host processor operability. The system management bus operates in the background, does not require CPU resources, and is independent of operating system. Therefore, the system management bus operates in parallel with and independently of other operations that are occurring on other buses within the computer system.

A system management bus is typically used for coupling devices, referred to as agents, which monitor operations of other devices in the system and/or display data to the user. Examples of devices which can be coupled to a system management bus include a monitoring card for monitoring disk drive functions, a control panel console for displaying the status of the disk drives within a system, and a power supply monitor for monitoring and reporting the status of the power supply in the system, among others.

Since the devices coupled to a system management bus generally perform control functions, the bus does not require high speed data transfer capabilities. Therefore a system management bus is typically implemented using a serial bus protocol. One popular serial bus protocol is referred to as the I²C serial bus developed by Phillips Corporation. In one implementation, the system management bus is implemented at the electrical level and the lowest protocol level using the I²C serial bus protocol, and an additional protocol may then be run "on top" of the I²C bus to facilitate data transfers between the devices.

Each agent coupled to a system management bus based on the I²C protocol is required to have its own I²C address for proper operation of the bus. The current method for assigning addresses to agents on the bus is for the designer to provide a hard wired solution or provide dip switches or jumpers. When the designer provides dip switches or jumpers, the user is required to either manually set the dip switches or jumpers or use configuration software to operate logical switches. This requirement to manually set switches or to operate switches through software can be both tedious and error prone. Therefore a system and method is desired for automatically assigning addresses to agents on a serial system management bus in a computer system without user intervention. A system and method is also desired which automatically assigns unique addresses to new "hot-pluggable" agents that are subsequently coupled to the bus.

SUMMARY OF THE INVENTION

The present invention comprises a system and method for automatically assigning addresses to agents on a system management bus in a computer system without requiring user intervention, i.e., without requiring the user to manually or programmatically set physical or logical switches. The computer system includes a system management bus which preferably uses the I²C serial protocol. The bus includes at least one SMB master and a plurality of slaves for performing desired monitoring and control functions in the computer system. According to the present invention, the SMB master performs a method to assign unique addresses to each of the SMB slaves automatically and without user intervention. This provides a simpler, more efficient, and less error prone method for assigning addresses to SMB agents. In addition, the system of the present invention automatically assigns unique addresses to new devices inserted on the bus while the bus is operating and thus allows for hot pluggable devices.

In the preferred embodiment, the SMB bus includes a protocol which runs "on top" of the I²C protocol that includes a plurality of commands. The SMB uses two commands for automatically assigning addresses to SMB agents according to the preferred embodiment of the invention, these being a Set Address command and a Get Identity command. The SMB master issues a Set Address command to direct an SMB agent that is responding at the agent class address to start responding to a new unique address. Thus the Set Address command assigns a new unique SMB address to an SMB agent. When the SMB master issues a Get Identity command to an SMB agent, the agent responds with several identifying bytes including some indicating that the nature of the agent and the particular revision. The response by the agent also includes a byte referred to as a "whim number", which is a pseudo-random number identifying the device.

Each of the SMB slaves is originally configured to operate at a class address. At the beginning of the method, the SMB master determines if any of the SMB slaves reside at the class address. If so, then the SMB master computes a new unique address and issues a Set Address command to assign this unique address to each of the slaves residing at the class address. Each of the slaves receives the Set Address command, receives the new unique address, and configures itself to the new unique address. The SMB master then issues a Get Identity command to devices at this unique address. In response to this command, each slave at the respective address transmits a plurality of identification bytes including a pseudo-random byte. If two or more slaves are operating at this "unique" address, one or more of the slaves will detect an error in one or more of the identification bytes. Those slaves which detect an error in transmission of a byte cease responding to the unique address and revert back to the class address.

In the preferred embodiment, the slaves in error also preferably compute a number N of leading correct bits in the byte in error and disable a response to the next N Set Address commands. Each slave generally computes a different number N of leading correct bits in the byte in error. When subsequent Set Address commands are issued, each of the respective slaves in error respond to a particular Set Address command depending upon the number N of leading correct bits of the byte in error. Thus, each slave generally responds to a different Set Address command and thus receives a new unique address. If each slave computes the same number N of leading correct bits in response to a Get Identity command, then each slave responds to the same Set Address command on a subsequent iteration. However, after several iterations, each slave soon responds to a different Set Address command due to the random nature of the identification byte. In this manner, each SMB slave receives a new unique address.

In an alternate embodiment, each SMB slave which detects an error in responding to a Get Identity command computes a pseudo-random time. During this time the respective slave refuses to honor a Set Address command. Each SMB agent generally computes a different pseudo-random time and thus only one agent responds to a Set Address Command at a time. This method also guarantees that the respective slaves will subsequently respond to unique Set Address commands and thus be assigned unique addresses.

In a third embodiment, each SMB slave includes bit-by-bit comparison logic which compares the bit actually being transferred on the bus with the respective bit that the slave desired to transfer. Thus, when the SMB master addresses each of the SMB agents at the same class address, each SMB agent responds. As the SMB slaves transmit identification bytes in response to a Get Identity command, only one slave completes transmission, and the remaining slaves cease responding when they are determined to be in error. The slave that completes a response to the Get Identity command maintains using its "unique" address, while the remaining slaves determined to be in error cease responding to this unique address and revert to the class address. Thus, on each set of Set Address and Get Identity commands issued by the SMB master, one SMB slave completes a response and receives a unique address, while the remaining slaves in error revert back to the class address. Thus, typically after X number of iterations for X number of slaves in the system, each slave receives its own unique address.

Therefore, the present invention comprises a system and method for automatically assigning unique addresses to SMB agents on a serial bus in a computer system. Accordingly, a user is not required to manually set dip switches or jumpers or use configuration software to set logical switches in order to configure addresses. Further, the method of the present invention operates every few seconds in the system and thus can automatically assign addresses to hot pluggable devices subsequently connected to the bus.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
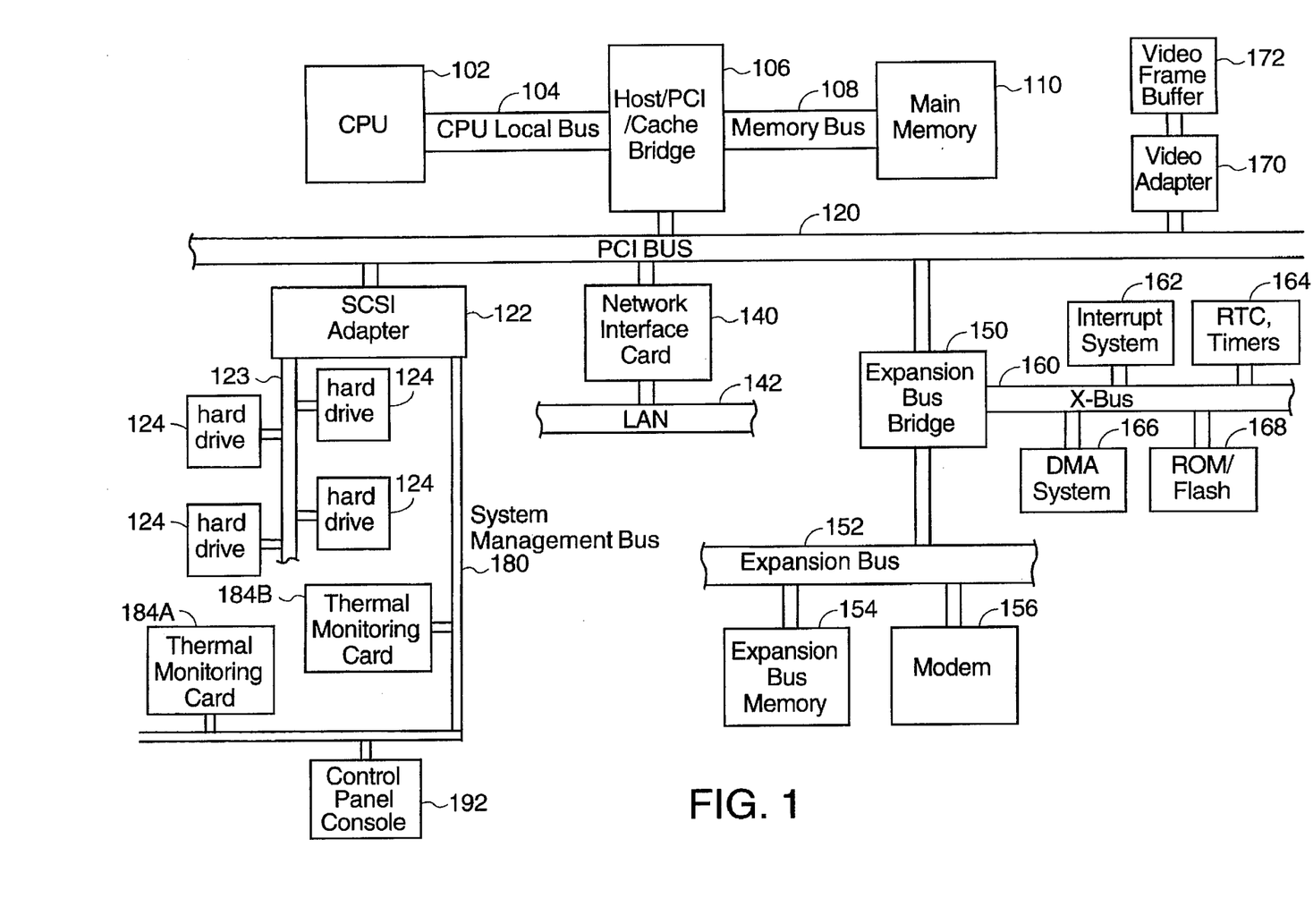
FIG. 1 is a block diagram of a computer system including a system management bus and implementing the system and method of the present invention.
Figure 2:
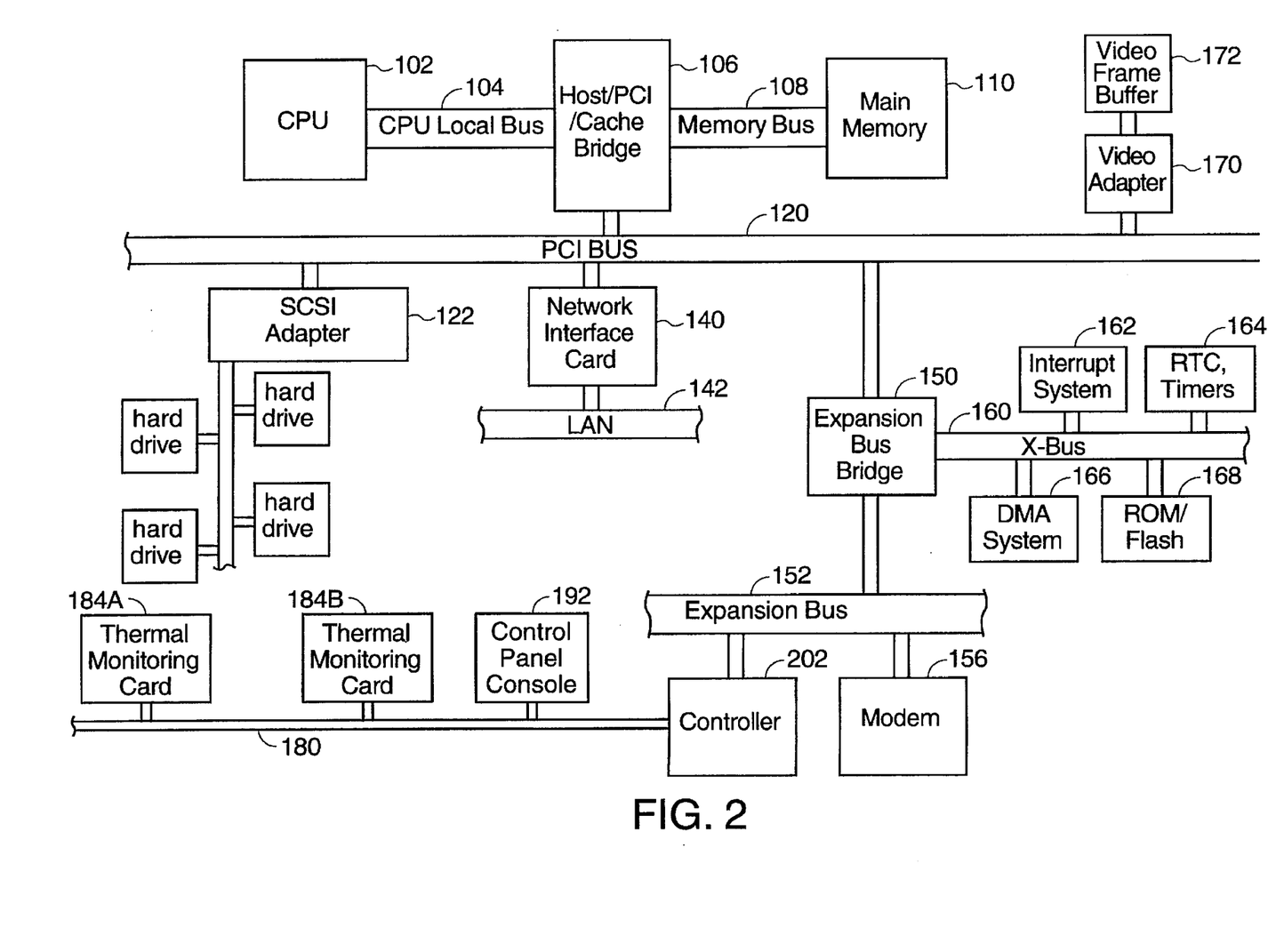
FIG. 2 is an alternate embodiment of the computer system of FIG. 1 including a dedicated SMB master which is coupled to the expansion bus of the computer system.
Figure 3:
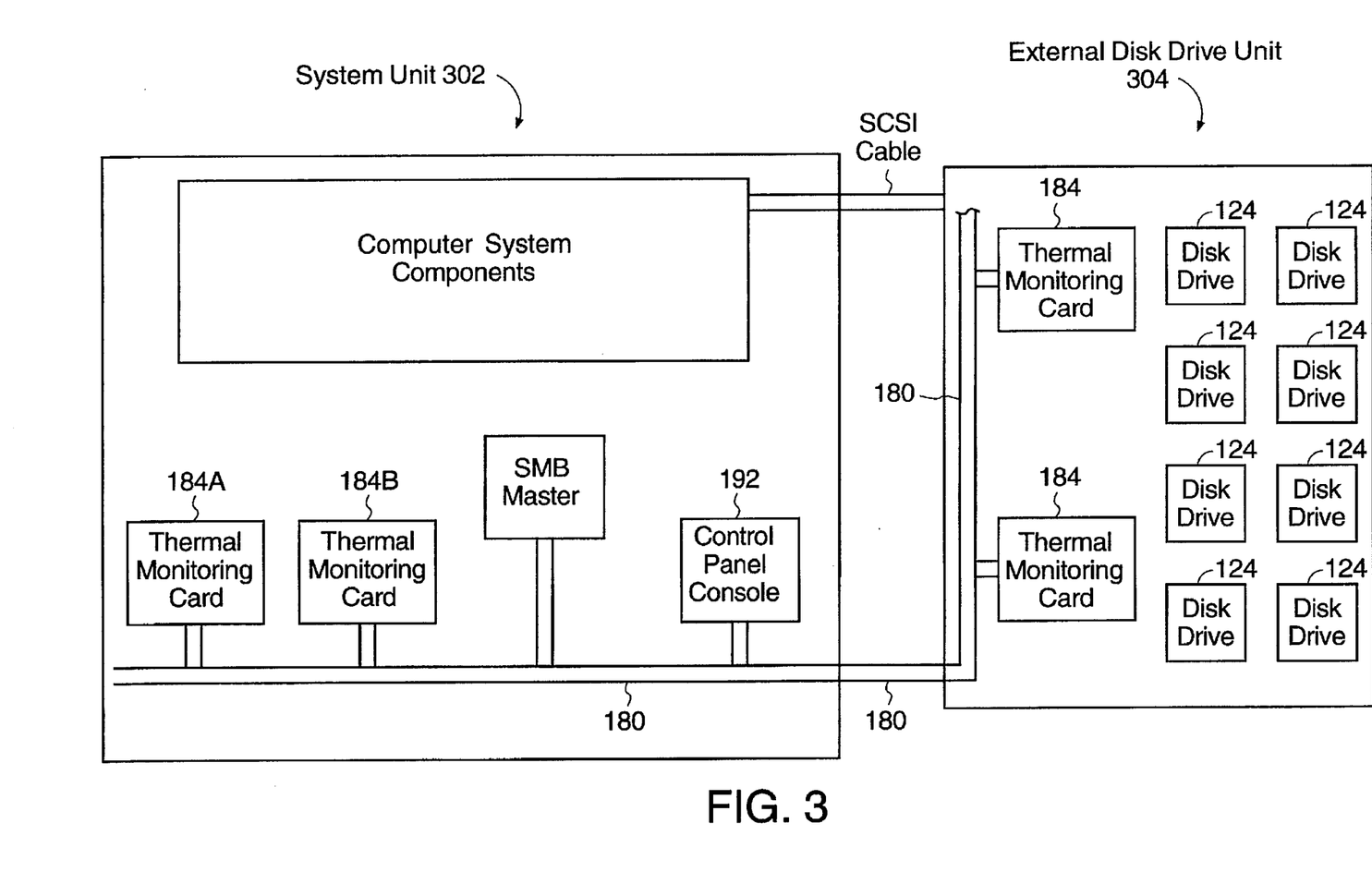
FIG. 3 illustrates a computer system including a system management bus, wherein the computer system includes a system unit and an external disk drive unit.

Computer Block Diagrams (FIGS. 1–3)

Referring now to FIG. 1, a block diagram of a computer system incorporating a system management bus and including the preferred embodiment of the present invention is shown. The present invention comprises a system and method for assigning unique addresses to devices connected to a serial bus, preferably a serial system management bus. It is noted that the present invention may be used with various types of serial buses and may be incorporated into any of various types of computer systems. As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus.

Various types of devices may be connected to the PCI bus 120. In the embodiment shown in FIG. 1, a video adapter 170 and video frame buffer 172 are coupled to the PCI bus 120 for controlling video functions. A SCSI (small computer systems interface) adapter 122 is coupled to the PCI bus 120. In the preferred embodiment, the SCSI adapter 122 includes firmware which enables the adapter 122 to operate as an SMB master as discussed further below. The SCSI adapter 122 includes a SCSI channel 123 which may have various connected devices. In the embodiment shown in FIG. 1, the SCSI channel 123 includes four disk drive units 124. It is noted that other devices may be connected to the SCSI channel 123, as desired. Various other devices may be connected to the PCI bus 120, such as a network interface card 140. As shown, the network interface card 140 interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, an interrupt system 162, a real time clock (RTC) and timers 164, a direct memory access (DMA) system 166, and ROM/Flash memory 168 are coupled to the X-bus 160. Other peripherals (not shown) are preferably connected to the X-bus 160, including communications ports, diagnostics ports, command/status registers, non-volatile static random access memory (NVSRAM), etc.

The computer system shown in FIG. 1 includes a system management bus 180 as shown. As discussed in the background section, the system management bus 180 provides connectivity between various monitoring devices in a system. The various monitoring devices connected to the bus 180 operate without involvement of the host processor 102 and operate independently of the operating system.

In the embodiment shown in FIG. 1, the SMB bus includes a plurality of slaves, including two or more thermal monitoring cards (TMCs) 184A and 184B and one or more control panel consoles 192. The TMCs 184A and 184B each measure the temperature and voltages of crucial components within the system. For example, in one embodiment the TMCs 184A and 184B are each physically situated near a grouping of one or more hard drives, and each TMC 184A and 184B monitors temperatures and voltage fluctuations of the respective grouping of hard drives, the associated fan and power supply, and the TMC itself. If the temperature and/or certain measured voltages of one or more drives are not within predefined tolerances, the respective thermal monitoring card sounds an alarm, which may include turning on LEDs within the respective control panel console 192 or sounding a speaker. Therefore, each thermal monitoring card (TMC) 184A and 184B performs thermal and voltage monitoring operations on a grouping of disk drives in the computer system. For more information on the thermal monitoring cards, please see the Dell PowerEdge SP 590-2 System User's Guide, Appendix C, available from Dell Computer Corporation, Austin, Tex., which is hereby incorporated by reference. Please also see the Dell PowerEdge XE 590-2 System Service Manual, available from Dell, which is hereby incorporated by reference.

The control panel console 192 monitors the status of the hard drives and includes a plurality of LEDs for indicating the status. For example, a respective LED may be red to indicate the disk drive is not operational, orange to indicate that the hard drive is inactive, and green to indicate that the hard drive is currently being accessed. It is noted that other types of SMB slaves may be comprised within the system which perform other functions, as desired. In the preferred embodiment, each SMB slave includes a Phillips PCB83C552 Microprocessor.

In the preferred embodiment, the SCSI adapter 122 includes firmware which enables the adapter 122 to operate as a system management bus (SMB) master. As shown in FIG. 2, in an alternate and equally preferred embodiment, the SMB master is configured as a separate dedicated microcontroller 202 coupled to the expansion bus 152. It is noted that various other configurations may be used, as desired.

Referring now to FIG. 3, in one embodiment the computer system includes a system unit 302 and a separate external disk drive storage unit 304 for storing additional disk drives. In this embodiment, the system management bus 180 couples between the system unit 302 and the external disk drive unit 304, and one or more monitoring devices comprised in the system unit 302 and the external disk drive unit 304 couple to the system management bus 180. As shown, the system unit 302 of the computer system includes a plurality of devices connected to the system management bus 180, including two thermal monitoring cards 184A and 184B, a control panel console 192, and an SMB master. The computer system unit 302 also preferably includes the various computer system components shown in FIG. 1, although these elements are not shown in FIG. 3 for simplicity. The external disk drive unit 304 includes a plurality of hard drives 124 and one or more monitoring devices connected to the system management bus 180, preferably one or more thermal monitoring cards 184 as shown.

System Management Bus—I$^2$C Serial Bus

In the preferred embodiment, the system management bus 180 is implemented using the Phillips I$^2$C serial bus. More specifically, in the preferred embodiment the system management bus is implemented at the electrical level and the lowest protocol level using the I$^2$C serial bus protocol. An additional protocol is preferably used "on top" of the I$^2$C bus which defines various bus commands to facilitate data transfers between the devices.

The I$^2$C bus comprises three lines including a serial data line, a clock line, and a ground wire. Each agent coupled to the I$^2$C bus includes an open collector or dot-or connection to the data line. Thus, if an agent desires to transmit a logical zero on the data line, the agent pulls the line low. An agent transmits a logical high value on the line by simply floating the line high, i.e., not driving the line. For more information on the Phillips I$^2$C serial bus please see the Signetics I$^2$C Peripherals for Microcontrollers Handbook, published January 1992 which is hereby incorporated by reference in its entirety.

As mentioned above, the SMB bus can include a plurality of devices or agents coupled to the bus. Each SMB agent can operate either in a master or slave mode and can also operate as either a transmitter or receiver. The difference between an SMB master and an SMB slave is that the master initiates transactions on the bus, i.e. the master arbitrates and gains ownership of the bus and then initiates a transfer. Therefore, the master initiates operations first, performs arbitration to gain control of the bus and then performs a transmission which includes addressing a slave. For example, the master can gain control of the bus, address a slave, and then may either transfer data to the slave or direct the slave to transmit information to the master. Thus, the master may reverse transmission directions in cooperation with the addressed slave and thus may either send data to a slave or receive data from a slave. Therefore, each I$^2$C bus agent is either a master or a slave and also is orthogonally either in transmitter mode or receiver mode.

The I$^2$C serial bus protocol provides for arbitration between multiple masters attempting to simultaneously access the bus. This is performed by each master examining the data actually transmitted on the bus and comparing this data to the data that the respective master is attempting to transmit. The I$^2$C data line is a dot-or serial bus where bits from each byte are transmitted serially on the bus. According to the I$^2$C specification, master transmitter hardware examines each bit actually appearing on the bus and compares it with each bit the master is attempting to transmit on a bit-by-bit basis. A master transmitter ceases transmission if a mismatch occurs. The master transmitter that is not "in error," i.e., the remaining master transmitter which has not detected an error, is able to continue its transmission. Thus, arbitration between multiple SMB masters is performed "on the fly" during transmission. No agent except the one or more master transmitters in error knows that there has been any problem, and the one or more master transmitters in error are free to try their transmissions again at a later time.

The I²C serial bus protocol definition does not require any comparison logic for SMB slaves. Therefore, components operating in slave mode are generally not configured with this bit comparison logic.

Agents coupled to the I²C bus are each addressed using a unique seven-bit code or address. In computer systems which utilize a system management bus, the computer system may include two or more SMB slaves, as shown in either of FIGS. 1, 2 or 3. Each SMB slave is required to have its own SMB/I²C address. According to the prior art, the designer hardwires a logical address or the unique address is provided by the user manually operating DIP switches or jumpers or using configuration software to operate logical switches. This requirement to manually or programmatically set addresses of SMB agents can be both tedious and error prone. Therefore, the present invention comprises a system and method for automatically assigning addresses to SMB agents without user involvement.

Figure 4:
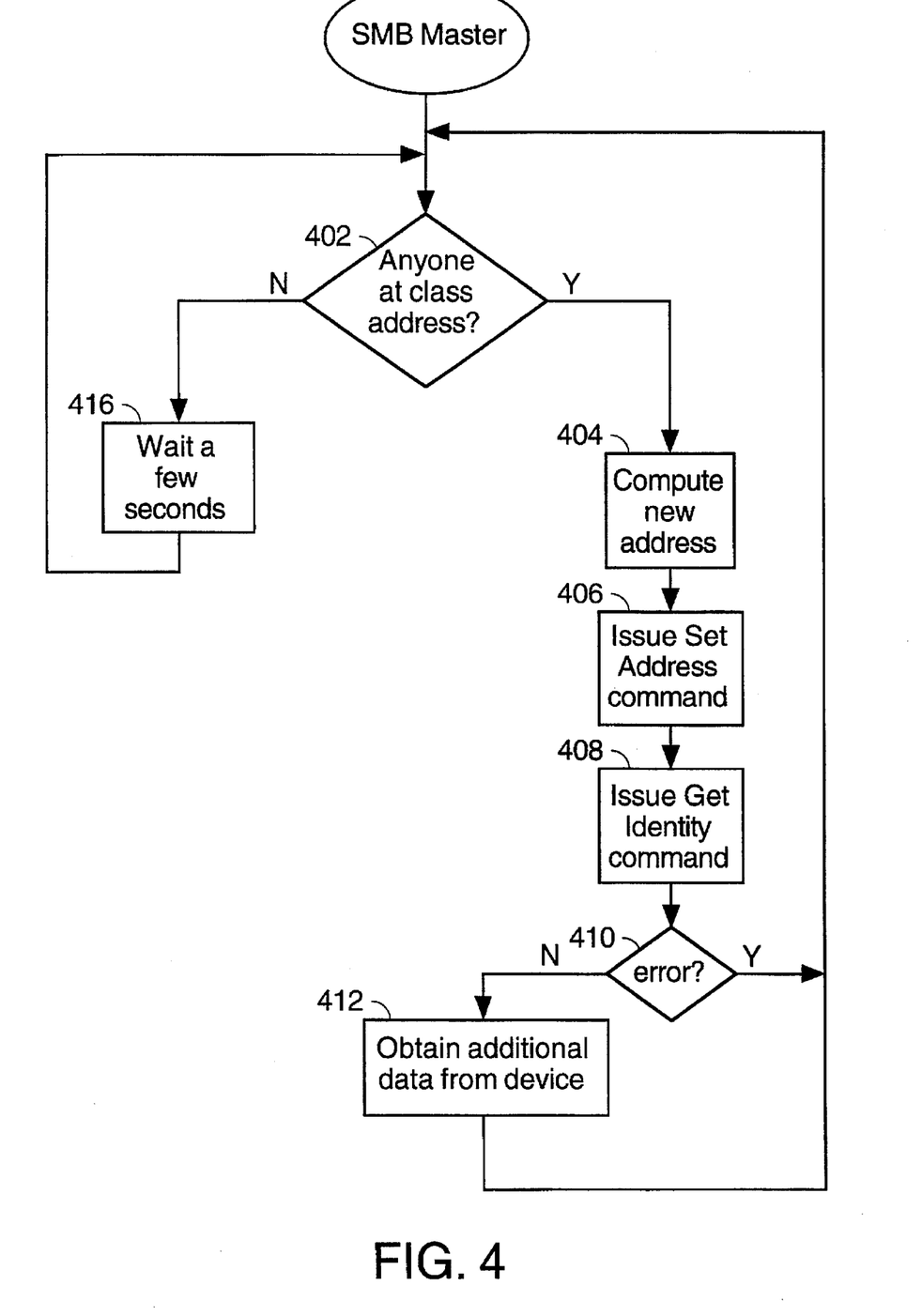
FIG. 4 is a flowchart diagram illustrating operation of the SMB master issuing Set Address and Get Identity commands to assign unique addresses to SMB agents according to the preferred embodiment of the present invention.
Figure 5:
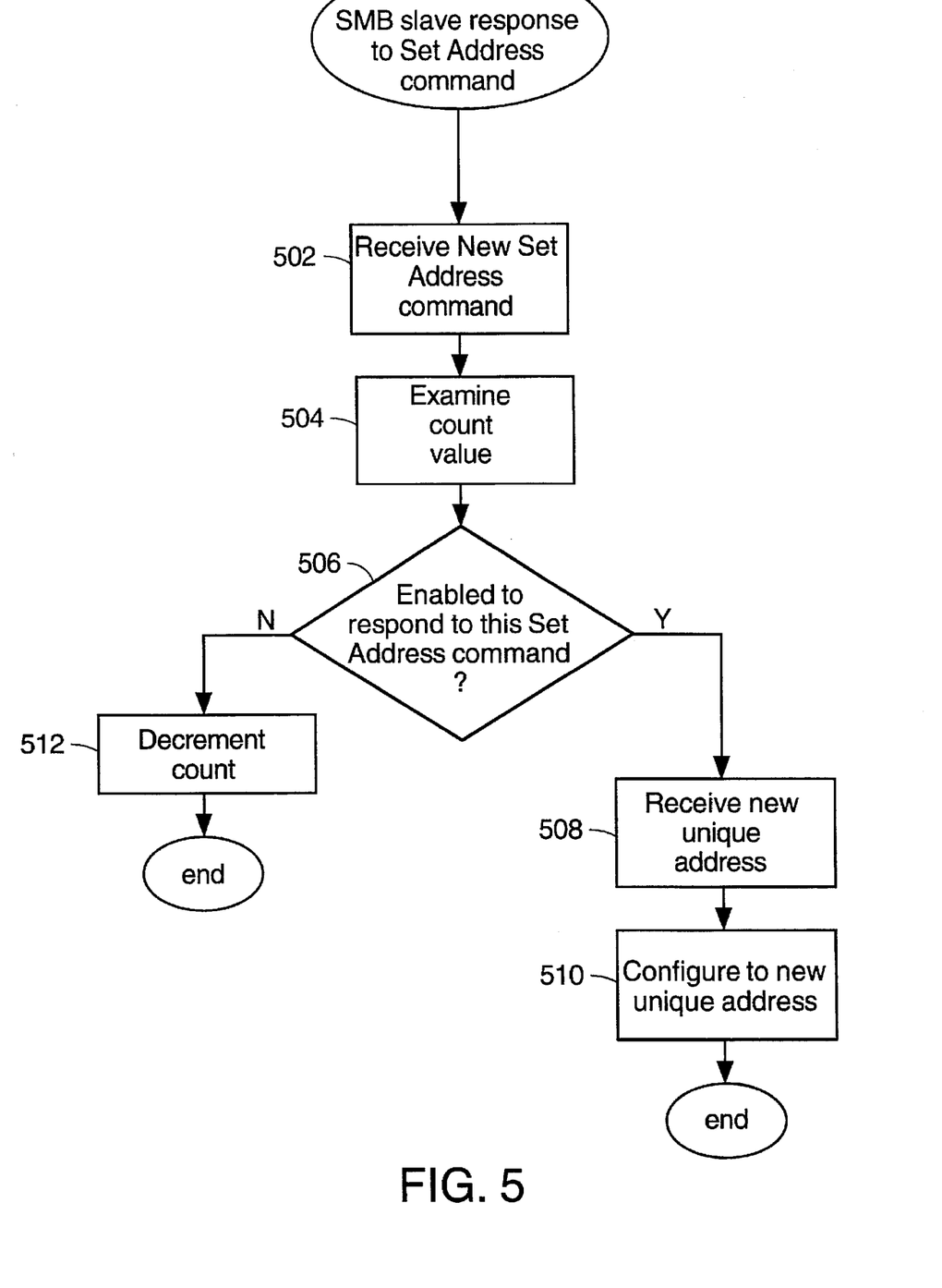
FIG. 5 is a flowchart diagram illustrating the response of an SMB agent to a Set Address command according to the preferred embodiment of the invention.
Figure 6:
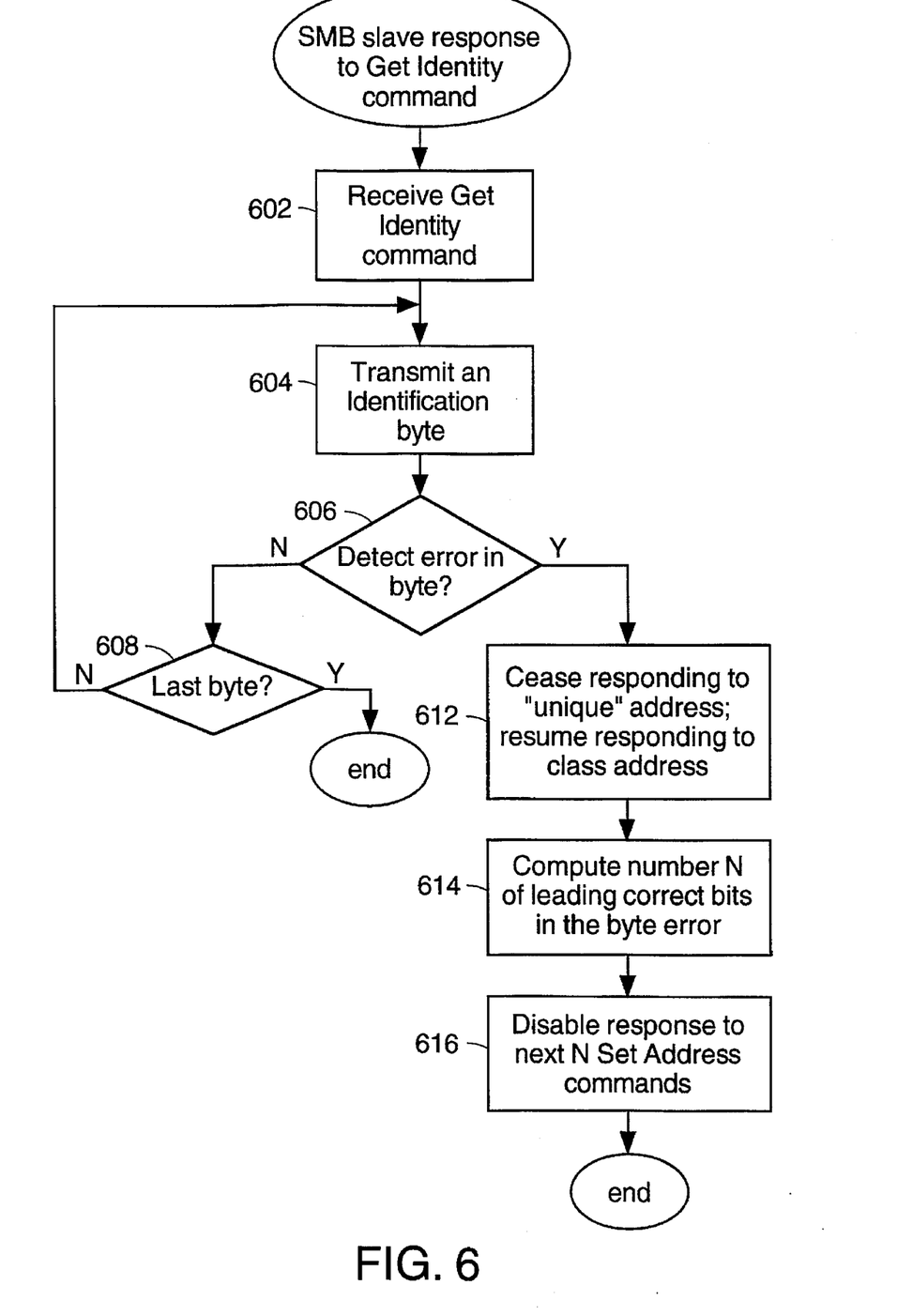
FIG. 6 is a flowchart diagram illustrating the response of an SMB agent to a Get Identity command according to the preferred embodiment of the invention.

First Embodiment—Compute Number N of Leading Correct Bits (FIGS. 4–6)

Referring now to FIG. 4, a flowchart diagram illustrating operation of an SMB master automatically assigning addresses to various SMB slaves in a computer system is shown. In step 402 the SMB master first determines if any of the SMB slaves reside at an address referred to as the class address. The class address is a default address of all agents of a particular type. It is noted that, at start-up, all of the SMB slaves are initially configured to operate at their respective class address. Thus, all TMCs are initially configured to respond at a first class address, all control panel consoles are initially configured to respond to a second class address, etc.

If one or more of the SMB slaves reside at the class address in step 402, then in step 404 the SMB master computes a new unique address for each of the SMB slaves. In step 406 the SMB master issues a Set Address command to the SMB slaves that reside at the class address. The manner in which the SMB slaves respond to a Set Address command is discussed further with regard to FIG. 5. In step 408 the SMB master issues a Get Identity command to the SMB slaves. The manner in which the SMB agents or slaves respond to the Get Identity command is discussed further with regard to FIG. 6. In step 410 the SMB master determines by the received bytes, which include a checksum byte, whether one or more of the received messages from the SMB slaves is in error in response to the Get Identity command. If so, then operation returns to step 402 and the SMB master repeats steps 402–410. If no error was reported in step 410, then only one respective SMB slave responded to the Get Identity command and thus this slave has been configured to receive the unique address computed in step 404. Accordingly, if no error was reported in step 410, in step 412 the SMB master obtains additional data from the device regarding its configuration and then returns to step 402 to repeat the above process.

In step 402 if none of the SMB slaves are determined to reside at the class address, then it is presumed that each of the SMB slaves has received a unique address different from the beginning class address. In this case, in step 416 the SMB master waits a period of seconds and during this time other operations are performed on the system management bus. After a certain period of time has elapsed, preferably two or three seconds, the SMB master returns to step 402 and repeats the above process. Thus, the SMB master periodically performs the method of the present invention. Accordingly, if a new SMB slave is added to the SMB bus, then within a short period the SMB master performs the above steps and automatically assigns a new unique address to the SMB slave added. Since the SMB master periodically performs this automatic configuration to assign unique addresses to the SMB slaves, a new SMB slave is hot pluggable into the SMB bus. Thus a new SMB slave subsequently added to the SMB bus receives a unique address without requiring user intervention.

Referring now to FIG. 5, a flowchart diagram illustrating the operation of an SMB slave responding to a Set Address command is shown. In step 502 the SMB slave receives the Set Address command. In step 504 the SMB slave examines a count value. This count value is generated during a response to a Get Identity command and is used to enable the SMB slaves to each respond to different Set Address commands in order to receive different unique addresses, as described further below. In step 506 the SMB slave determines if it is enabled to respond to the Set Address command. When the Set Address command is first issued in step 406, i.e., prior to the first issuance of the Get Identity command in step 408, each SMB slave is enabled to respond to the Set Address command. If the SMB slave is enabled to respond to this Set Address command, in step 508 the SMB slave receives the new unique address from the SMB master and in step 510 the slave configures itself to the new unique address, and operation then completes. If the SMB slave is determined to not be enabled to respond to the Set Address command in step 506, then in step 512 the SMB slave decrements the count value and then completes operation.

Referring now to FIG. 6, a flowchart diagram illustrating operation of an SMB slave responding to a Get Identity command is shown. In step 602, the SMB slave receives the Get Identity command. In response to a Get Identity command, the SMB slave transmits a plurality of identification bytes including information indicating the nature of the slave and its particular revision. One of the bytes transmitted is a "whim number". As discussed above, each slave generates for itself a new pseudo-random whim number each times it boots, each time it reverts to a local mode, and each time it detects a transmission error when in slave transmitter mode. The term "local mode" means that the agent is in a stand-alone mode because either the master is not present or the master is not communicating.

In step 604 the SMB slave transmits a first identification byte. After transmission of the first byte of its identification information in step 604, in step 606 the SMB slave determines if an error was detected in transmission of the respective byte. As previously mentioned, each SMB slave samples the data bus when the slave transmits data but does not do anything automatically if a miscompare occurs. When a transmission error does occur, the SMB slave makes available the entire byte of actually transmitted data and a program executing on the processor compares the actually transmitted byte to the byte that was intended to be transmitted. If an error is not detected, then in step 608 the SMB slave determines if this was the last byte of its identification bytes. If so, then operation completes. If this is not the last byte in the transfer of the slave's identification bytes in step 608, then the slave returns to step 604 and transmits the next identification byte. The SMB slave repeats steps 604, 606 and 608 until all identification bytes have been transmitted.

If the SMB slave detects an error after the transmission of a byte in step 606, then in step 612 the SMB slave ceases responding to the unique address received previously in the Set Address command and reverts back to using the class address. The SMB slave also generates a new whim number. In step 614 the SMB slave computes a number N of leading correct bits in the byte in error. In other words, after detecting an error in step 606 and ceasing to respond to the "unique" address in 612, in step 614 each slave in error computes the number N of leading correct bits in the byte that was in error. Bits of bytes are transmitted on the I²C bus starting with the most significant bit in each byte and ending with the least significant bit. For a byte that is "in error" there must be at least one error bit. The number of "leading" correct bits is therefore greater than or equal to zero and less than or equal to seven. Once the number N of leading correct bits have been calculated in step 614, in step 616 the SMB slave disables response to the next N Set Address commands issued by the SMB master. Therefore, the SMB slave refuses to honor the next N Set Address commands where N is the calculated number of leading correct bits in the error byte. The count value examined in step 504 of FIG. 5 is set to N and used by the respective slave to disable responses to these next N Set Address commands.

In general, the number N of leading correct bits in the byte in error is generally different between each of the SMB slaves. However, even if the number of leading correct bits of bytes generated by two different SMB slaves in error are the same, since the error is typically calculated based on the pseudo-random whim number, eventually only SMB slaves will respond to a respective Set Address command. As discussed above, when only one SMB slave responds to a Set Address command, this slave receives a new unique address.

Figure 7:
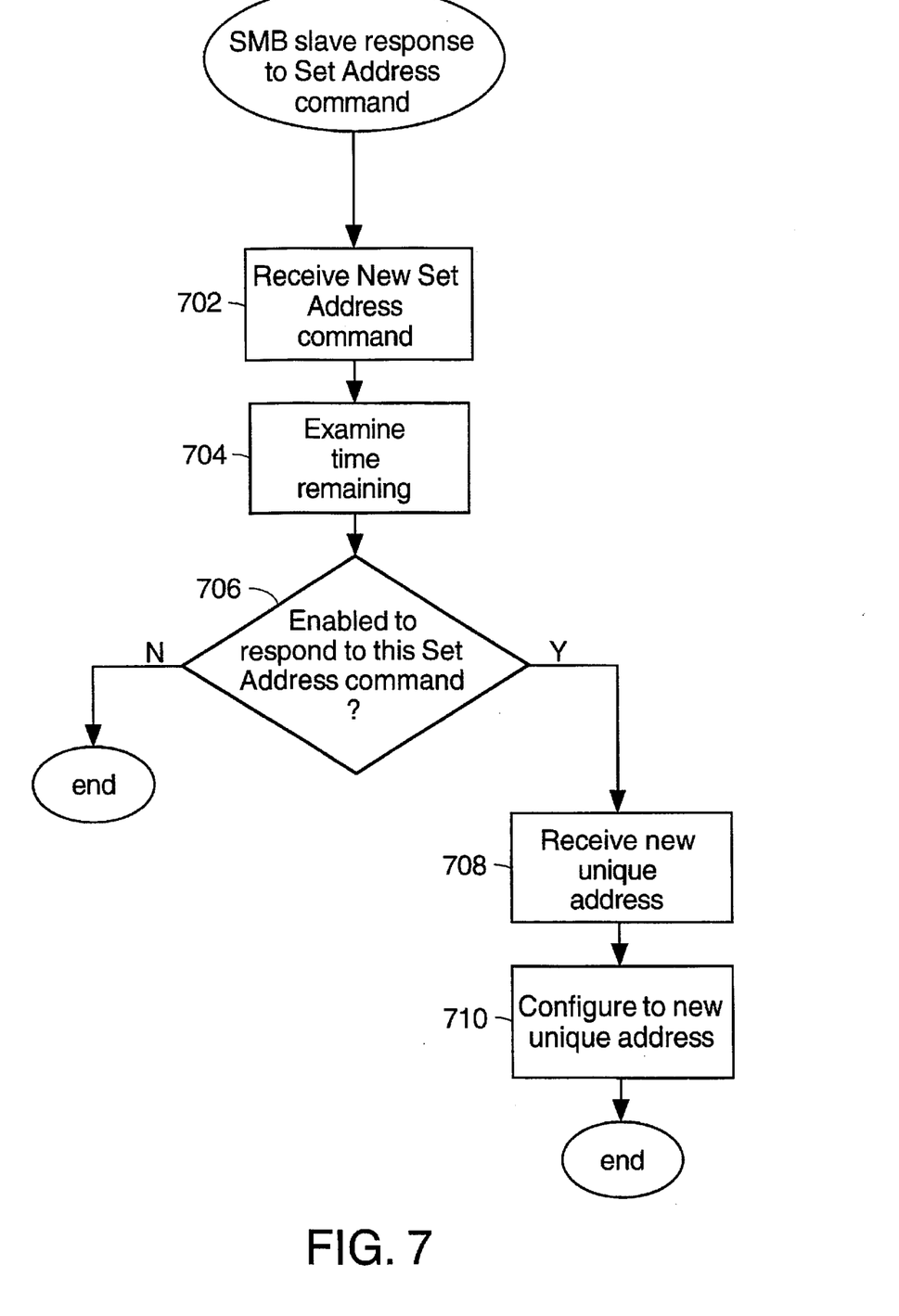
FIG. 7 is a flowchart diagram illustrating the response of an SMB agent to a Set Address command according to a second embodiment of the invention.
Figure 8:
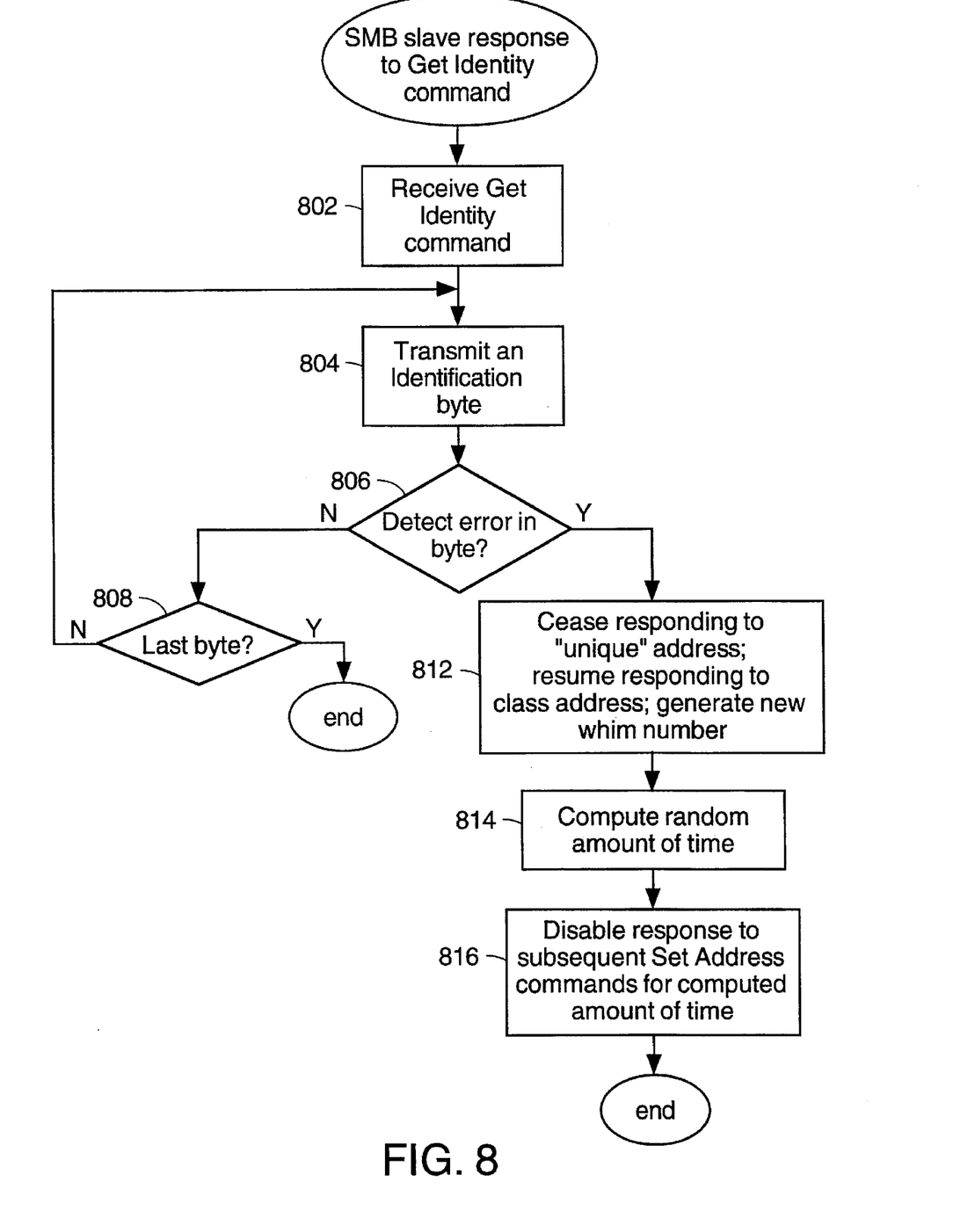
FIG. 8 is a flowchart diagram illustrating the response of an SMB agent to a Get Identity command according to a second embodiment of the invention.

Second Embodiment—Compute Random Time (FIGS. 7 and 8)

Referring now to FIGS. 7 and 8, flowchart diagrams illustrating operation of an SMB slave responding to a Set Address command and a Get Identity command, respectively, according to a second embodiment of the invention is shown. In this embodiment, the SMB master performs the same steps as shown in FIG. 4. Also, in this embodiment each respective slave in error computes a random time instead of a number N of leading correct bits, and this time is used to disable response to a number of subsequent Set Address commands.

Referring now to FIG. 7, in step 702 the SMB slave receives the Set Address command. In step 704 the SMB slave examines the current time remaining and in step 706 determines if it is enabled to respond to the Set Address command. As noted above, this time remaining is initially set during a response to a Get Identity command when the slave detects an error. When the Set Address command is first issued in step 406, i.e., prior to the first issuance of the Get Identity command in step 408, each SMB slave is enabled to respond to the Set Address command. If the SMB slave is enabled to respond to this Set Address command, in step 708 the SMB slave receives the new unique address from the SMB master and in step 710 the slave configures itself to the new unique address, and operation then completes. If the SMB slave is determined to not be enabled to respond to the Set Address command in step 706, then operation completes.

Referring now to FIG. 8, a flowchart diagram illustrating operation of an SMB slave responding to a Get Identity command is shown. In step 802, the SMB slave receives the Get Identity command. As discussed above, in response to a Get Identity command the SMB slave transmits a plurality of identification bytes including information indicating the nature of the slave and its particular revision. One of the bytes transmitted is a "whim number", which is a pseudo-random number.

In step 804 the SMB slave transmits a first identification byte. After transmission of the first byte of its identification information in step 804, in step 806 the SMB slave determines if an error was detected in transmission of the respective byte. As previously mentioned, each SMB slave samples the data bus when the slave transmits data but does not do anything automatically if a miscompare occurs. When a transmission error does occur, the SMB slave makes available the entire byte of actually transmitted data and a program executing on the processor compares the actually transmitted byte to the byte that was intended to be transmitted. If an error is not detected, then in step 808 the SMB slave determines if this was the last byte of its identification bytes. If so, then operation completes. If this is not the last byte in the transfer of the slave's identification bytes in step 808, then the slave returns to step 804 and transmits the next identification byte. The SMB slave repeats steps 804, 806 and 808 until all identification bytes have been transmitted.

If the SMB slave detects an error after the transmission of a byte in step 806, then in step 812 the SMB slave ceases responding to the unique address received previously in the Set Address command and resumes using the class address. The SMB slave also generates a new whim number. In step 814 the SMB slave computes a random amount of time, preferably between 2 and 15 seconds. In other words, after detecting an error in step 806 and ceasing to respond to the "unique" address in 812, in step 814 each slave in error computes the pseudo-random time value. In step 816 each SMB slave disables response to Set Address commands issued by the SMB master during this random time. A timer is preferably loaded with this random time value, and the slave examines this timer in step 704 of FIG. 7.

Therefore, this method is similar to the method of FIGS. 5 and 6 except that in FIG. 6 instead of computing the number N of leading correct bits in the byte in error in step 614 and then disabling response to the next N Set Address commands in step 616, the respective SMB slave computes a pseudo-random time in step 814 and disables response to subsequent Set Address commands for that amount of time in step 816. Also, as shown in FIG. 7, during a Set Address command each slave examines the time remaining in step 704 instead of examining a count value as in step 504 of FIG. 5. The method of FIGS. 7 and 8 also has the effect of eventually resulting in only one SMB slave responding to a respective Set Address command and thus each slave receiving a unique address.

Third Embodiment—Slave Bit Comparison Logic

Figure 9:
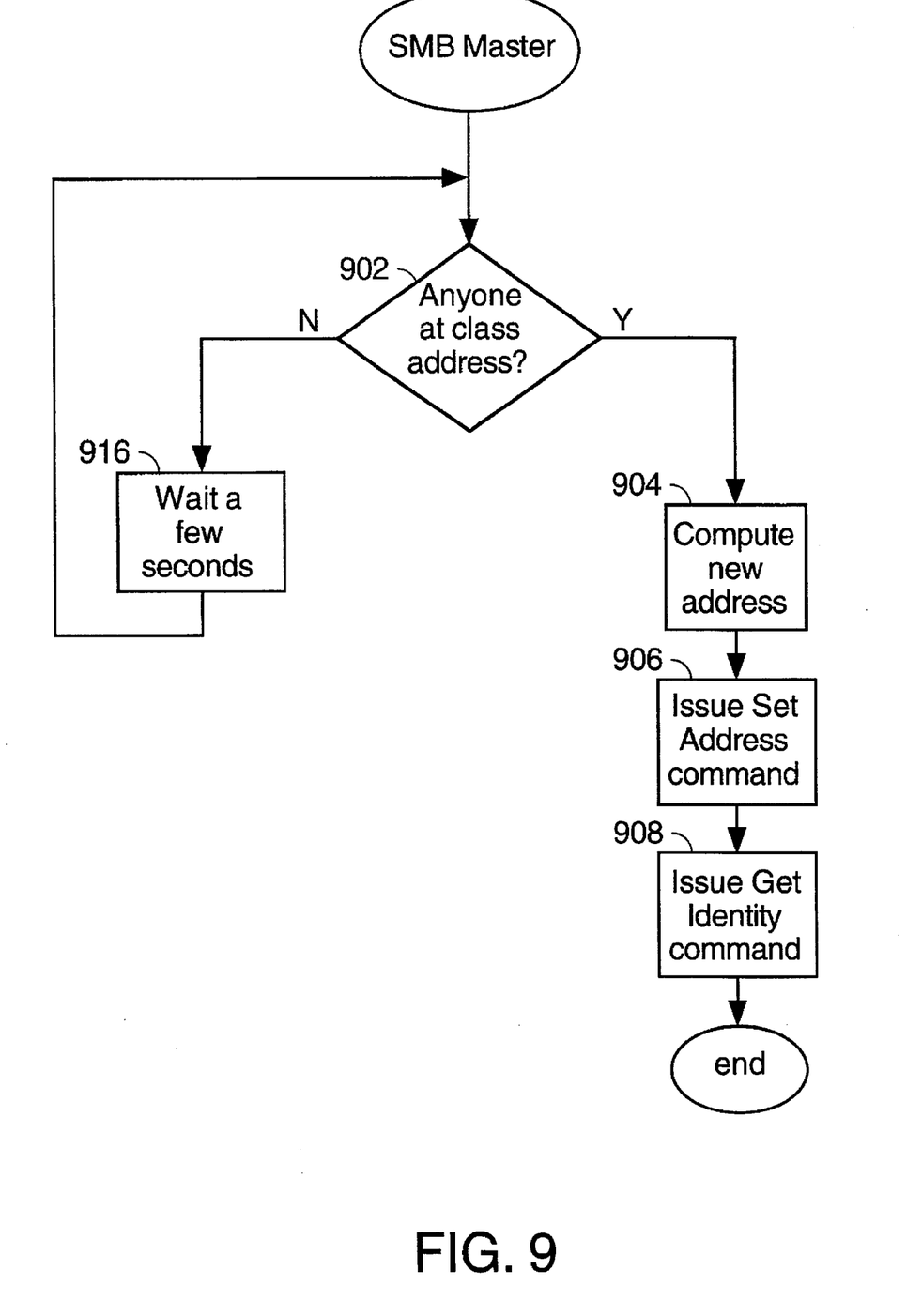
FIG. 9 is a flowchart diagram illustrating operation of the SMB master issuing Set Address and Get Identity commands to assign unique addresses to SMB agents, wherein the SMB agents include bit error detection logic according to a third embodiment of the present invention.
Figure 10:
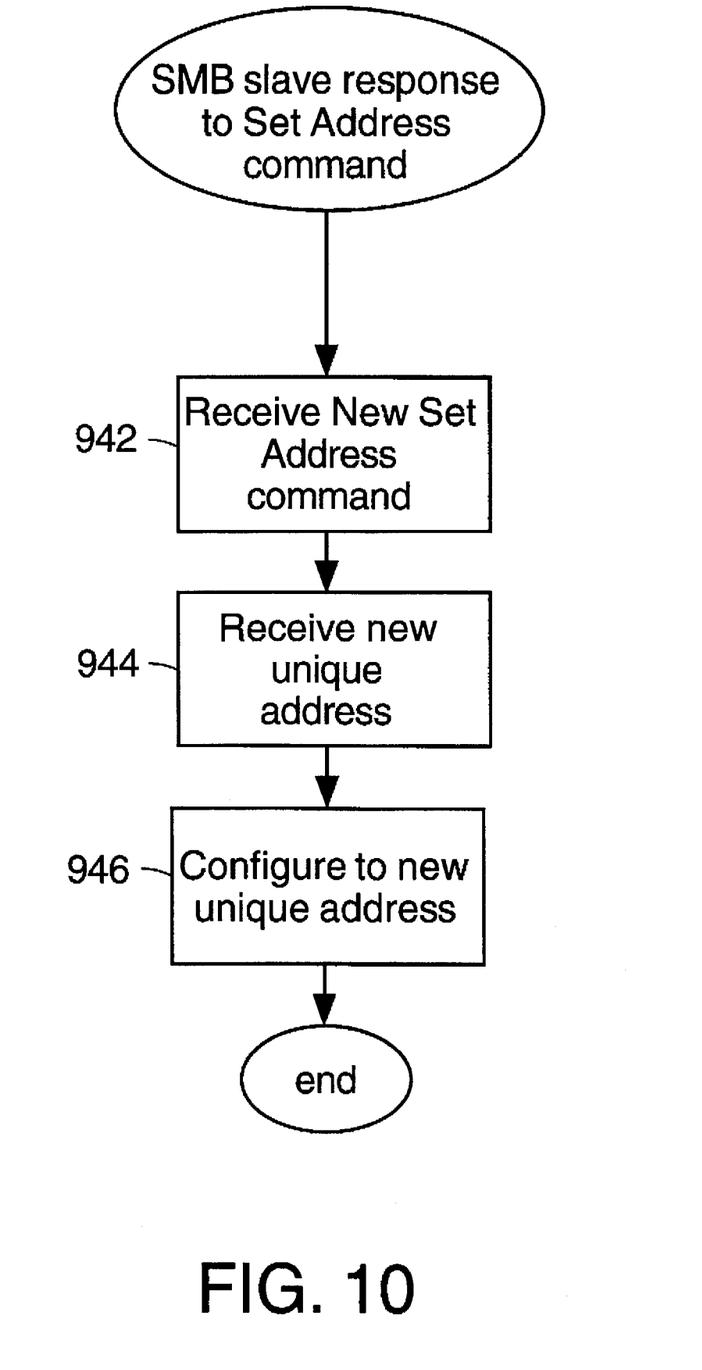
FIG. 10 is a flowchart diagram illustrating the response of an SMB agent to a Set Address command according to the third embodiment of the invention.
Figure 11:
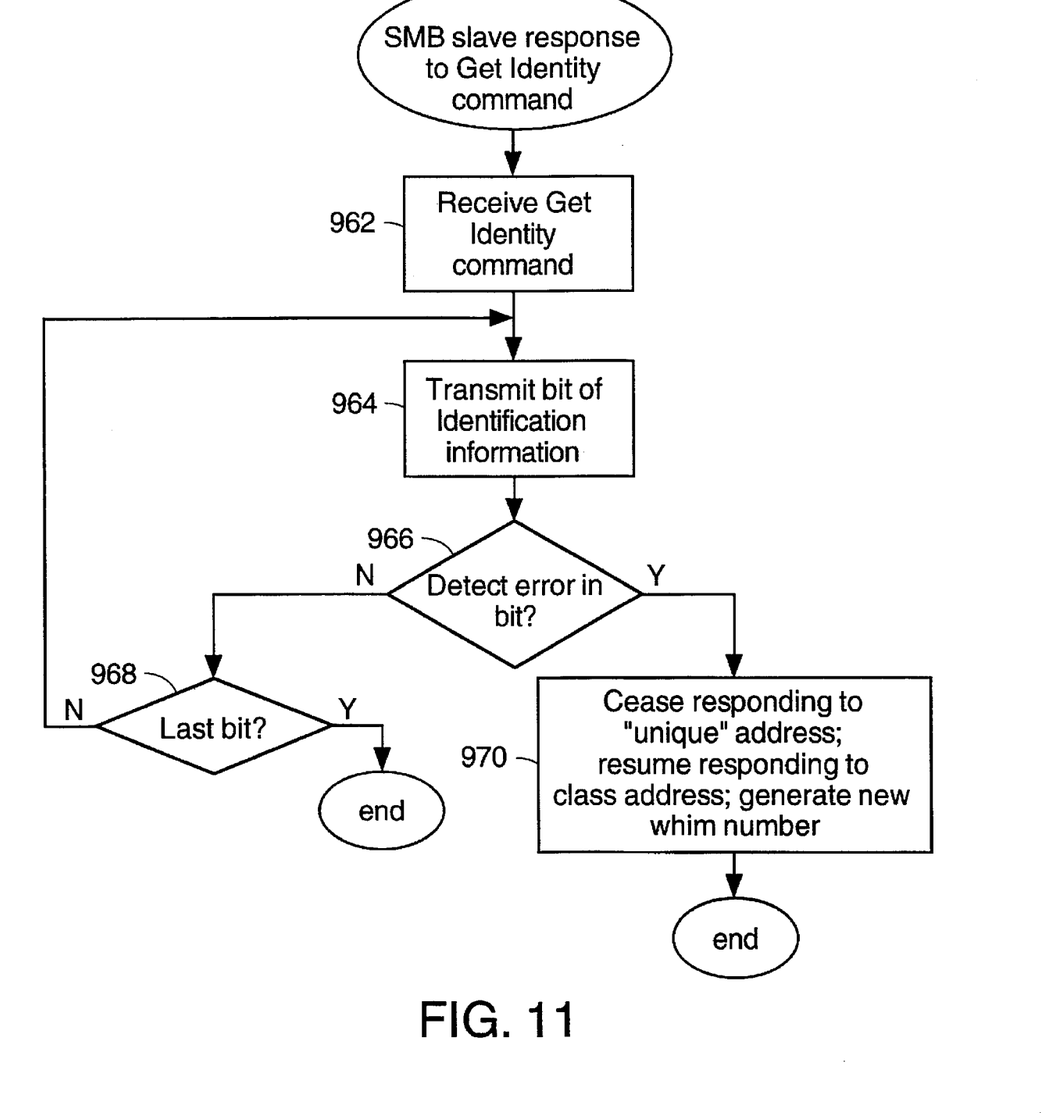
FIG. 11 is a flowchart diagram illustrating the response of an SMB agent to a Get Identity command according to the third embodiment of the invention.

Referring now to FIGS. 9–11, in a third embodiment of the present invention, each SMB master and in addition each SMB slave includes bit-by-bit comparison logic. As discussed above, the I²C serial bus protocol provides for arbitration between multiple masters attempting to simultaneously access the bus. One way this is accomplished is by each master examining the data actually transmitted on the bus and comparing this data with the data the master desires to transmit on a bit-by-bit basis. Thus, transmitter hardware in each master is required by the I²C specification to examine each bit actually appearing on the bus and compare this bit with the respective bit that the master tried to transmit on the bit-by-bit basis. The master transmitter ceases transmission should a mismatch occur. The master transmitter that was not "in error" continues on with its transmission and is not aware that other masters attempted to transmit. The I²C specification only requires that master transmitters have this bit-by-bit comparison logic. Presumably, there was no perceived utility in enabling slave transmitters to also perform this bit-by-bit comparison.

However, in a third embodiment of the invention, each slave transmitter also includes bit-by-bit transmission logic similar to a master transmitter. In this embodiment, when each slave responds to a Get Identity command, respective slaves that become in error cease transmission when a mismatch is detected. Due to the dot-or nature of the serial bus, one slave always completes a valid response to a Get Identity command, and the remaining SMB slaves which are in error cease transmission. This one slave that completes a response retains its unique address received by the Set Address command while the remaining slaves that were in error cease responding to the unique address and revert back to the class address. Therefore, after several iterations of the SMB master issuing a Set Address command and a Get Identity command, each SMB slave in turn receives a unique address.

Referring now to FIG. 9, a flowchart diagram illustrating operation of an SMB master automatically assigning addresses to various SMB slaves in a computer system according to this third embodiment is shown. In step 902 the SMB master first determines if any of the SMB slaves reside at the class address. It is noted that, at start-up, all of the SMB slaves are initially configured to operate at the class address. If one or more of the SMB slaves reside at the class address in step 902, then in step 904 the SMB master computes a new unique address for each of the SMB slaves. In step 906 the SMB master issues a Set Address command to the SMB slaves that reside at the class address. The manner in which the SMB slaves responds to a Set Address command according to this third embodiment is discussed further with regard to FIG. 10. In step 908 the SMB master issues a Get Identity command to the SMB slaves. The manner in which the SMB agents or slaves respond to the Get Identity command according to this third embodiment is discussed further with regard to FIG. 11. It is noted that one SMB slave will always respond to the Get Identity command issued in step 908, and thus it is not necessary to determine if one or more of the SMB slaves reported an error in response to the Get Identity command as in FIG. 4.

In step 902 if none of the SMB slaves are determined to reside at the class address, then it is presumed that each of the SMB slaves has received a unique address different from the class address. In this case, in step 916 the SMB master waits a period of seconds and during this time other operations are performed on the system management bus. After a certain period of time has elapsed, preferably two or three seconds, the SMB master returns to step 902 and repeats the above process. Thus, the SMB master periodically performs the method of the present invention. Accordingly, if a new SMB slave is added to the SMB bus, then within a short period the SMB master performs the above steps and automatically assigns a new unique address to the SMB slave added. Thus a new SMB slave subsequently added to the SMB bus receives a unique address without requiring user intervention, i.e., a new SMB slave is hot pluggable into the SMB bus.

Referring now to FIG. 10, a flowchart diagram illustrating the operation of an SMB slave responding to a Set Address command is shown. In step 942, the SMB slave receives the Set Address command. In step 944 the SMB slave receives the new unique address from the SMB master and in step 946 the slave configures itself to the new unique address, and operation then completes.

Referring now to FIG. 11, a flowchart diagram illustrating operation of an SMB slave responding to a Get Identity command is shown. In step 962 the SMB slave receives the Get Identity command. As discussed above, in response to a Get Identity command, the SMB slave transmits a plurality of identification bytes including information indicating the nature of the slave and its particular revision. One of the bytes transmitted is a "whim number". As discussed above, each slave generates for itself a new pseudo-random whim number each times it boots, each time it reverts to a local mode, and each time it detects a transmission error when in slave transmitter mode.

In step 964 the SMB slave transmits a first bit of identification information. After transmission of each bit of identification information in step 964, in step 966 the SMB slave determines if an error was detected in transmission of the respective bit. As previously mentioned, in this embodiment each SMB slave includes bit comparison logic. Each SMB slave samples the data bus after transmission of each bit and compares the bit on the bus with the bit that the slave desired to transmit. If an error is not detected, then in step 968 the SMB slave determines if this was the last bit of its identification information. If so, then operation completes. If this is not the last bit in the transfer of the slave's identification information in step 968, then the slave returns to step 964 and transmits the next identification bit. The SMB slave repeats steps 964, 966 and 968 until all identification information has been transmitted.

If the SMB slave detects an error after the transmission of a bit in step 966, then in step 970 the SMB slave ceases responding to the unique address received previously in the Set Address command and resumes using the original class address. The SMB slave also generates a new whim number. It is noted that at least one, and generally only one, SMB slave always completes a response in this embodiment, and thus generally on each Set Address and Get Identity command pair a new SMB slave receives a new unique address.

Conclusion

Therefore, at power up, all of the SMB agents in a specific class or with a specific ID command response are configured to respond initially to a common class address, and the SMB master initially communicates with every SMB agent at this class address simultaneously. The SMB master discovers the SMB agents by detecting slave responses to the SMB agent class address. If there is a response, the SMB master uses the Set Address command to assign a unique address to all of the SMB agents responding to the class address. In the first and second embodiments, this means that several SMB agents may then have the same unique address. The SMB master then issues a Get Identity command to the SMB agents at the new unique address. If multiple SMB agents respond to the Get Identity command, most and/or all of the agents will detect a slave transmission error when they transmit their own pseudo-random whim number as part of the Get Identity response. Every SMB agent which responds that detects a slave transmission error ceases responding to the unique SMB address and resumes responding to the class address.

It is noted that the above method could be repeated numerous times with none of the SMB agents successfully transmitting its whim number and thus never successfully assigning unique addresses to each of the SMB agents. The present invention includes two methods which are used to guarantee that only one SMB slave responds to subsequent respective Set Address commands, and these methods enable the SMB master to assign unique addresses to each of the SMB agents. In the preferred embodiment, each slave in error computes the number N of leading correct bits in the byte and refuses to honor the next N Set Address commands. In an alternate embodiment, the slaves in error compute a random time and refuse to honor Set Address commands during that time. It is noted that the first solution is advantageous because time is not a factor. In other words, in the first method the SMB master repeatedly provides Set Address commands until all SMB agents have been assigned a unique address. The second method which computes a pseudo-random time mandates that each SMB address only receives its unique address after at least that pseudo-random time has elapsed, which is generally longer than the first method. In the third embodiment, each slave includes bit comparison logic, and this guarantees that only one slave completes a response to each Get Identity command at the respective slave's unique address.

Therefore, a system and method for automatically assigning unique addresses to agents on a system management bus in a computer system is shown. This obviates the necessity of a user having to manually set dip switches or jumpers or having to use configuration software to operate logic switches to assign unique addresses to the SMB agents. Further, the system and method of the present invention allows hot pluggable SMB agents to be connected to the bus while the bus is operating, and the method of the present invention automatically configures a unique address to the new agent installed in the system.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A method for assigning unique addresses to devices on a bus in a computer system, wherein the computer system comprises a master coupled to the bus and a plurality of slaves coupled to the bus, the method comprising the steps of:

the master issuing a first command to assign a unique address to one or more of said plurality of slaves coupled to the bus;

the master requesting identification information from said one or more of said plurality of slaves on said bus using said unique address;

said one or more of said plurality of slaves transmitting data to the master in response to said step of requesting information;

said one or more of said plurality of slaves determining if an error occurred in said step of transmitting data;

said slaves which detect an error in said step of transmitting ceasing to respond to said unique address, said slaves which detect an error each having a respective byte in error;

said slaves which detect an error in said step of transmitting each disabling response to one or more subsequent first commands;

a slave maintaining use of aid unique address if said slave determines that an error did not occur in said step of transmitting; and the master reputing said steps issuing said first command and requesting identification information until each of aid slaves receives a unique address wherein, for each of said one or more of said plurality of slaves, said step of determining if an error occurred in said step of transmitting data comprises:

attempting to transmit a byte of data;

reading a byte of data transmitted on said bus during said step of attempting to transmit said byte of data; and comparing said byte of data attempted to be transmitted with said byte of data read on said bus to determine if said byte of data attempted to be transmitted equals said byte of data read on said bus wherein said slaves which detect an error in said step of transmitting each compute a respective number N of leading correct bits in said respective byte in error; and said slaves which detect an error disable response to a subsequent N number of said first commands.

2. The method of claim 1, wherein each of said plurality of slaves begin operation at a class address;

wherein said step of the master issuing a first command to assign a unique address to one or more of said plurality of slaves on the bus includes addressing said one or more of said plurality of slaves using said class address and assigning said one or more of said plurality of slaves at said class address said unique address; and wherein said slaves which detect an error in said step of transmitting cease responding to said unique address and resume responding to said class address.

3. The method of claim 1, further comprising:

wherein said step of transmitting data to the master in response to said step of requesting information comprises said one or more of said plurality of slaves each transmitting a random byte;

wherein said slaves which detect an error detect said error in transmitting said random byte of data in said step of transmitting data; and wherein said slaves which detect an error in said step of transmitting each compute said number N of leading correct bits in said random byte in error.

4. The method of claim 1, further comprising:

said slaves which detect an error in said step of transmitting computing an amount of time; and said slaves which detect an error disabling response to subsequent first commands for said amount of time.

5. The method of claim 1, wherein said bus is a serial bus.

6. The method of clam 5, wherein said bus utilizes an $I^2C$ serial protocol.

7. The method of claim 1, wherein said bus is a system management bus in said computer system, and wherein said plurality of slaves performing monitoring functions in said computer system.

8. The method of claim 1, wherein said method is performed periodically during operation of said computer system.

9. A computer system, comprising:

a serial bus a plurality of devices coupled to the serial bus, wherein said plurality of devices begin operations at a common class address, the plurality of devices including a plurality of slaves; and a master coupled to the bus which assigns a different unique address to each of said plurality of devices coupled to the bus;

wherein said master includes:

means for assigning a unique address to one or more of the plurality of devices on the bus; and means for requesting identification information from said one or more of said plurality of devices on said bus using said unique address;

wherein each of said plurality of slaves includes:

means for receiving an assigned unique address and configuring to said unique address;

means for transmitting data to the master in response to requests for information;

means for determining if an error occurred during transmission of data, wherein each of said plurality of slaves which detect an error during transmission of data cease responding to said unique address and resume responding to said class address, and wherein each of said plurality of slaves which detect an error during transmission of data disable response to one or more subsequent first commands, wherein a slave maintains use of said unique address if said slave determines that an error did not occur;

wherein said means for assigning a unique address and said means for requesting identification information alternately operate until each of said plurality of devices receives a unique address;

wherein said means for determining if an error occurred comprises means for determining if an error occurred in a byte of data during transmission of data, wherein said slaves which detect an error each have a byte in error;

wherein each of said slaves which detect an error during transmission compute a respective number N of leading correct bits in said byte in error; and said slaves which detect an error disable response to a subsequent N number of said first commands.

10. The computer system of claim 9, wherein said slaves which detect an error during transmission compute an amount of time; and wherein said slaves which detect an error disable response to subsequent first commands for said amount of time.

11. The computer system of claim 9, wherein said bus utilizes an I$^2$C serial protocol.

12. The computer system of claim 9, wherein said bus is a system management bus in said computer system, and wherein said plurality of slaves perform monitoring functions in said computer system.

* * * * *